Nov. 7, 1967    S. SCHOTT ETAL    3,350,745
ROTATIONAL MOLDING
Filed May 26, 1966    2 Sheets-Sheet 1

Nov. 7, 1967  S. SCHOTT ETAL  3,350,745
ROTATIONAL MOLDING
Filed May 26, 1966  2 Sheets-Sheet 2

STUART SCHOTT
LEROY J. MEMERING
INVENTOR.

3,350,745
ROTATIONAL MOLDING
Stuart Schott, Cincinnati, Ohio, and Leroy J. Memering, Covington, Ky., assignors to National Distillers and Chemical Corporation, New York, N.Y., a corporation of Virginia
Filed May 26, 1966, Ser. No. 553,177
4 Claims. (Cl. 18—26)

This invention relates to improvements in the rotational molding of powdered plastics, and more particularly relates to a rotational molding apparatus and process which provides for more rapid cooling, more uniform cooling and cooling under an atmosphere to which the plastic is inert at the elevated temperature of the molding process.

Rotational molding processes are well known for making hollow, divided or open end plastic objects of various sizes from a powdered polymer. Any powdered polymer can be used, in the dry state or as liquid dispersion, which is capable of forming a film under the influence of heat. These powders are produced by mechanical reduction of commercial size pellets in suitable grinders such as a Pallman mill or by precipitation from a solution. Particles with smooth spherical shape to coarse irregular shape can be used, and any particle size, shape and distribution can be used which gives the desired wall thickness and distribution of the polymer on the walls of the mold. Generally, smaller particle size materials (5–15 microns) are used for thin wall items while larger particles (300–2000 microns) are used for thick wall items. Normally, powdered thermoplastics of nominal 20 (840 microns) to 50 (297 microns) mesh particle size are used in rotational molding for wall thickness of 0.050" to 0.250".

Basically, the molding process consists of placing the plastic in finely divided form inside of a mold. The mold is then heated to a temperature above the melting point of the plastic and, at the same time, it is rotated on two perpendicular axes. The powdered plastic inside the mold is heated by the heat transfer from mold surface and sticks to the inner mold surface. Heating is continued for a sufficient length of time for complete melting of all the plastic particles and to permit bubbles to be released from the molten plastic. The thickness of the plastic article is determined by the amount of plastic placed within a given mold.

After heating is completed, the mold is cooled by contacting the exterior surface of the mold with air, water spray or by immersion in water. The mold is normally vented to equalize the pressure during the heating and cooling cycles. After the cooling cycle is finished, the mold is opened and the molded plastic article removed.

Short cycle times for heating and cooling are desired for economic reasons. In addition, most plastics are heat-sensitive, so that minimum heating temperature and time are used consistent with complete fusion of the plastic particles and removal of bubbles from the finished article. Once the fusion and removal of bubbles are accomplished, cooling should be carried out as quickly as possible to give a molded article of high impact strength. However, as mentioned above, cooling in the prior art is obtained by transferring heat from the outer surface of the hot plastic to the mold. Since this cooling occurs almost entirely from the outer surface of the molded article, strains are set up because of large variations in temperature between the inner and outer surface of the plastic article with resultant uneven contraction of the plastic. This problem is aggravated further since the plastic shape, as it cools, shrinks away from the mold due to the higher coefficient of expansion of the plastic compared to metal. This results in slower cooling after this shrinkage has occurred.

A further disadvantage in the prior art molding processes is that cooling of the plastic by heat conduction into the hollow space in its interior is minimal because there is no movement of the enclosed gas to the exterior other than the breathing through the vent tube.

In accordance with the invention, a cooling fluid is circulated through the interior of the plastic object under a slight positive pressure and vented to the atmosphere following the heating cycle which fluid could be a stream of air, or preferably an inert gas, to provide for cooling the interior surface of the plastic object while the exterior surface is being cooled by the mold in the usual prior art manner which, in turn, is being cooled by air circulation or water spray or water immersion. In addition, the slight internal pressure aids in holding the object to mold surface.

By inert gas is meant a gas which does not degrade the plastic by reaction with it at the highest temperature used in rotational molding. If desired, preliminary cooling of the interior can be carried out with an inert gas until the temperature of the plastic surface has lowered to a sufficient extent to make it non-reactive with air, following which air can be passed through the molded plastic in place of the inert gas. Thus, the invention provides all of the advantages of quick cooling, e.g., reduced molding cycle and waste, therefore lower manufacturing cost, increased impact strength and absence of discoloration. At the same time, there is obtained a product with a minimum of undesirable warpage.

It is an object of the present invention to provide for rapid cooling in a rotational molding process without undesirable distortion or warpage of the plastic.

It is also an object of this invention to provide rapid cooling in a rotational molding process to give a molded object of high impact strength.

Another object of this invention is to provide rapid cooling in a rotational molding process in which the molded plastic is exposed to high temperatures for the minimum period of time.

Still another object of this invention is to provide for the rapid cooling of plastic in a rotational molding structure under an inert atmosphere to provide a plastic object which has not been discolored by reaction of the hot plastic with cooling fluid.

Another object of this invention is to maintain good conformity of the molded plastic article to the mold pattern.

These and other objects of this invention will become apparent from the following description when taken in connection with the drawings, in which.

Figure 1:
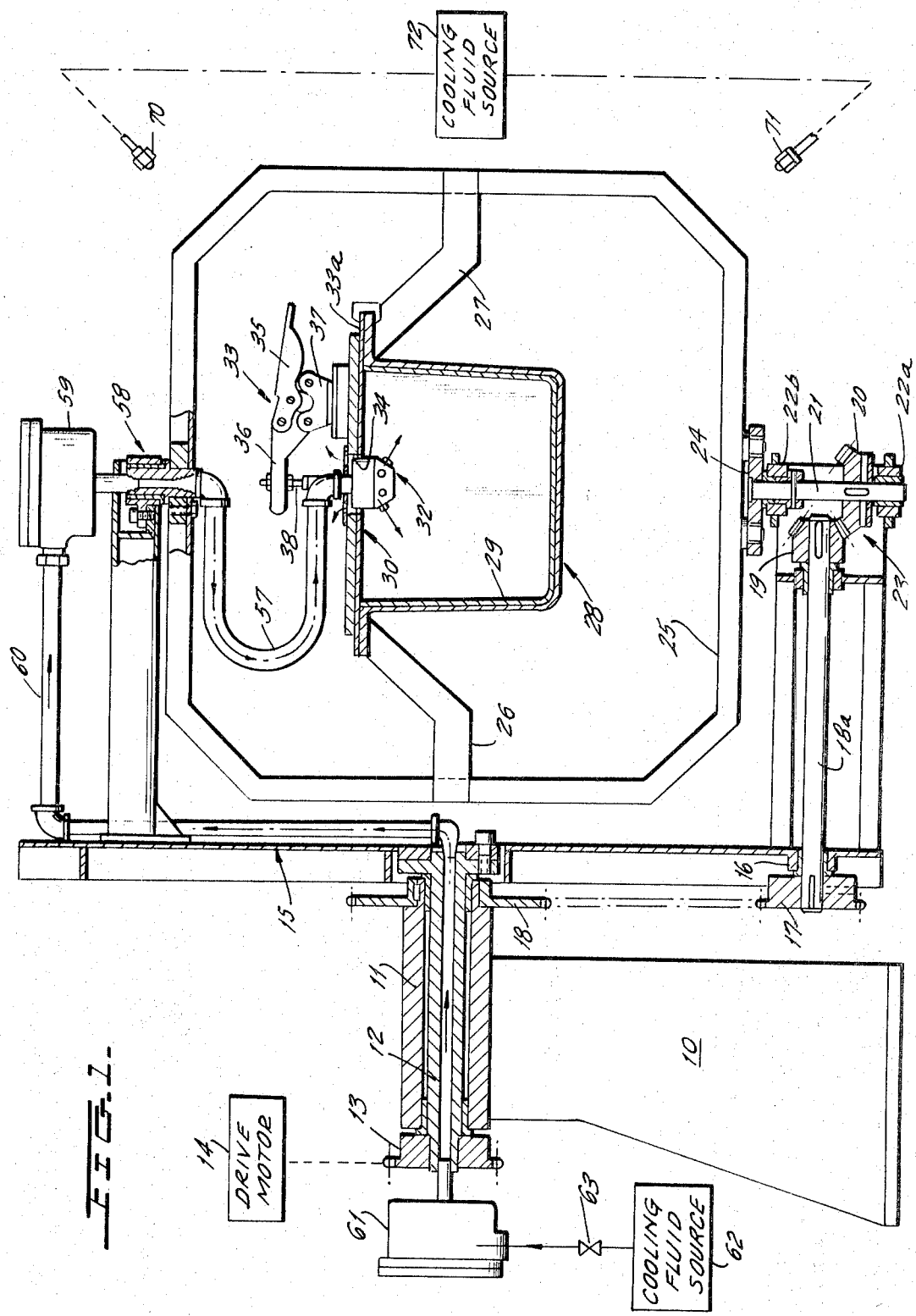
FIGURE 1 shows a rotational molding apparatus in cross-section, as modified in accordance with the invention.

Referring first to FIGURE 1, the apparatus of the invention is contained in a suitable insulated hot air oven (not shown) which is heated to 350–950° F., or any temperature suitable for the plastic used. The molding apparatus is of the standard commercially available type and includes a suitable support base 10 which carries a support bearing 11. A rotatable shaft 12 extends though bearing 11 and has a chain-gear sprocket 13 at one end thereof which is suitably driven by a drive motor 14. The other end of shaft 12 is suitably rigidly connected to rotating frame 15.

Frame 15 carries a bearing 16 which rotatably mounts chain-gear sprocket 17. A chain then connects rotating sprocket 17 to a fixed chain-gear sprocket 18 which is fixed to bearing 11. Chain-gear sprocket 17 then has a shaft 18a keyed thereto at one end. The other end of shaft 18a carries bevel gear 19 which is keyed to shaft 18a and meshes with bevel gear 20.

Bevel gear 20 is keyed to shaft 21 which is rotatably mounted on bearings 22a and 22b which are carried on support structure 23 which is suitably mounted from rotating frame 15. Shaft 21 is then fixed to plate 24 which is, in turn, connected with drive pins to rotating cage 25. Cage 25 then has mounting pedestals 26 and 27 extending therefrom which serve to mount mold 28 as by clamping or welding, or the like.

The mold 28 is made of sheet metal, but any material suitable for a mold, e.g., cast aluminum or electroformed copper, may be used. Mold 28 has an interior shape which conforms to the exterior of the article being formed. In the example used to illustrate the invention, the mold 28 has a box shape, the interior of which is to be lined with the molded article 29. The box shape mold herein described is intended to illustrate but not limit the mold which can have any desired configuration.

Up to this point, the apparatus is of the well known type. In accordance with the invention, the mold lid 30 is of a novel construction and has the vent cap 31 of FIGURE 2, or the internal cooling head 32 of FIGURE 3, selectively connected thereto by the clamp 33 in FIGURE 1.

FIGURE 1 illustrates cooling head 32 in position in lid 30. The lid 30 is lined with an insulation panel 33a and has a central opening 34 therein. The central opening 34 is large enough to receive either vent 31 of FIGURE 2 or cooling head 32 of FIGURE 3.

Figure 2:
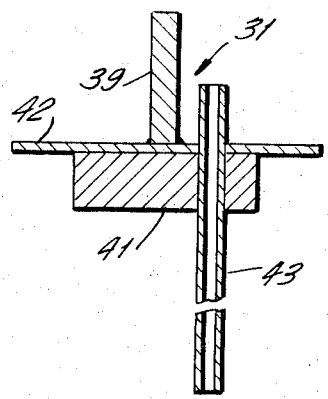
FIGURE 2 shows a cross-section through the vent cap that is connectable to the mold lid of FIGURE 1.

Clamp 33 is secured to lid 30 and includes an operating lever 35 which operates a lever 36 through a suitable overcenter toggle mechanism 37. Lever 36 has a pressure pad 38 adjustably connected thereto which clamps atop the rod 39 of vent 31 of FIGURE 2 or rod 40 of cooling head 32 of FIGURE 3 to hold the vent 31 or cooling head 32 in position on lid 30. That is, to place vent 31 in position on lid 30, the vent body 41 of FIGURE 2 is placed in opening 34 and the plate 42 seats atop plate 30 to prevent vent 31 from passing through opening 34. The hollow vent tube 43 then communicates between the interior of mold 28 and the exterior atmosphere. Pressure pad 38 of clamp 33 is then locked on rod 39 to rigidly hold vent 31 in position.

The cooling head is connected to lid 30 in a similar manner where, however, the cooling head has a plate 50 with a plurality of openings therein such as openings 51 and 52 which are evenly spaced around the perimeter to keep head 32 from passing through opening 34 in lid 30. The cooling head 32 then includes a nozzle portion 53 having a plurality of internal channels such as channels 54 and 55 which lead to a common channel 56 which extends through plate 50.

The channel 56 is then connected to conduit 57 which passes through a support bearing 58 connected to frame 15 and through a rotary union 59. Rotary union 59 then has an input conduit 60 which is connected to frame 15 and communicates through the center of shaft 12 with rotary union 61. A suitable input conduit connected to rotary union 61 is then connected to a cooling fluid source 62 through valve 63.

External cooling jets of the usual type are also provided, as shown schematically in FIGURE 1, by nozzles 70 and 71 connected to cooling fluid source 72.

In operation, the mold and lid are coated with a suitable release agent such as Dow-Corning DC–20 silicone resin. The plastic load is placed in mold 28 and the vent 31 is clamped in lid 30 to permit gas venting during the molding operation. The assembly is then placed in a suitable oven, and drive motor 14 is turned on. Motor 14 causes sprocket 13 to rotate which causes shaft 12 and frame 15 connected thereto to rotate. This component of rotation causes rotation of cage 25 about an axis colinear with shaft 12. Since sprocket 18 is stationary, the rotation of sprocket 17, carried on frame 15, about sprocket 18 will cause shaft 18a to rotate with respect to frame 15, thereby rotating shaft 21. This, in turn, causes cage 25 to rotate about an axis colinear with shaft 21.

Thereafter, the mold is rotated in the oven in this manner for a sufficient time to melt the plastic and eliminate air bubbles, with hot air and gas venting through the vent tube 43 of the vent 31. The rotating mechanism and mold are then removed from the oven and motor 14 is deenergized to stop mold rotation.

Figure 3:
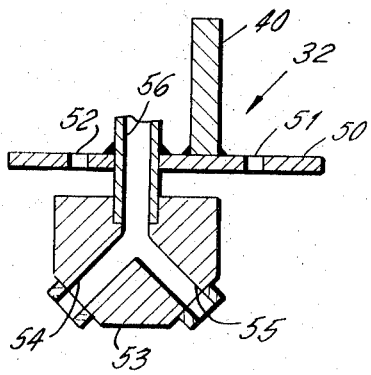
FIGURE 3 shows a cross-section through the internal cooling cap that is shown connected to the lid of FIGURE 1 for internal mold cooling.

Vent plug 31 is then removed and the cooling head 32 of FIGURE 3 is clamped into place by clamp 33, as shown in FIGURE 1. Motor 14 is reenergized to cause rotation of cage 25 and mold 28 so that the molten polymer 29 of FIGURE 1 firmly adheres to the mold walls. Valve 63 is then opened to permit a suitable coolant, such as gaseous nitrogen from cooling fluid source 62 to be admitted into the mold interior through the cooling head 32 and to impinge on the mold interior at a slight positive pressure. The hot cooling fluid is allowed to escape through vents of plate 50, shown in FIGURE 3. At the same time, cooling fluid such as water is taken from source 72 and is applied to the mold exterior through suitable nozzles such as nozzles 70 and 71.

After the mold and product are cooled, the product can be removed for further treatment, e.g., removal of flash, decorating, packaging, etc.

The advantages of the invention will be illustrated in the following examples:

EXAMPLE 1

A linear polyethylene box with wall thickness of 0.12 inch was made by rotational molding using forced air cooling on the outside mold surface. Impact strength of the box wall was 1100 ft. lbs./inch with slight warpage.

EXAMPLE 2

A linear polyethylene box of the same size and wall thickness as Example 1 was molded using the same heating cycle as Example 1, but cooled by spraying cold water on the mold. Impact strength of the box was in excess of 5000 ft. lbs./inch, but warpage was so bad that obtaining a reasonably flat sample for testing was impossible.

EXAMPLE 3

The process of Example 1 was repeated, except that at the end of the heating cycle, the mold cover was removed and water sprayed in the form of a fine mist on the inside of the polyethylene box while the outside of the mold was cooled by water spray. There were slight marks on the interior surface of the polyethylene box where the water droplets had contacted molten polyethylene. Impact strength of the box wall was over 5000 ft. lbs./inch and warpage was intermediate between Examples 1 and 2. These examples show that cooling of the rotationally molded plastic article from both sides gives the high impact advantage of rapid cooling with the low warpage advantage of slow cooling.

In order to test this invention in a practical manner, a gas fired, hot air rotational molding machine was modified so that inert gas could be fed into the mold following the fusion of the powdered plastic inside the mold without stopping the rotating machanism.

EXAMPLE 4

The process of Example 1 was repeated, except that at the end of the heating cycle compressed air at 15 p.s.i. was fed through a cooling orifice through the inside of the mold and exhausted, while at the same time water was sprayed on the outside of the mold until the cooling period was over. Impact strength of the box wall was 4000 ft. lbs./inch, but warpage was equivalent to Example 1, i.e., only slight warpage. Thus, the benefits of fast cooling were obtained with respect to impact strength, and at the same time obtaining the benefit of slow cooling in the form of low warpage. In Examples 1 through 4, it was noted that a slight brownish discoloration of the plastic occurred, presumably due to oxidation by the contained air of the plastic at high temperatures of molding.

EXAMPLE 5

The process of Example 1 and Example 4 was repeated, with the exception that compressed nitrogen at 8 lbs. p.s.i. was fed to and through the inside of the mold and exhausted to the atmosphere. The resulting polyethylene box had no discoloration, the impact strength was 5000 ft. lbs./inch and warpage was equivalent to that obtained in Example 1.

While the details of the process are given to a sufficient extent to enable the process to be used, variations and modifications may be resorted to without sacrificing the benefits of the invention.

The process has been described with particular reference to powdered linear polyethylene of a density range of 0.945 to 0.970 gm./cc., and a melt index of 1.0 to 20.0 gm./10 min. and the internal cooling of such materials constitutes a preferred application. However, it is understood that the process is not limited to any particular plastic; for example, conventional polyethylene of low and medium density, ethylene copolymers, polypropylenes, polyvinyl chlorides, etc., may also be employed.

The process has been described with reference to a box mold, but it is understood that the process is not limited and can be used for any hollow, open ended or divided object by suitable changes in the mold, gas entry and discharge lines, etc.

While the preceding description refers to the use of cooling head 32 after the mold is removed from the oven, it is possible to install cooling head 32 at the beginning of the molding process. In this case, a non-adherent material with low thermal conductivity would be connected to nozzle 53 of FIGURE 3 to prevent the polymer from clogging the vents to enable an uninterrupted molding cycle. Moreover, it should be understood that the mold opening receiving the venting and cooling means could be much smaller than that shown in FIGURE 1.

It is also understood that the process lends itself to various other types of internal cooling medium, for example, atomized water, spray, steam, carbon dioxide, etc. The process is not restricted by the type of external cooling nor by whether the mold is rotating during cooling.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A rotational molding apparatus for molding an open-end article comprising a mold, a lid for said mold, said lid being lined with an insulating panel, said lid being provided with a centrally located opening, a cooling head receivable within said opening and depending therethrough, rotation mean connected to said mold for rotating said mold about orthogonal axes, connection means for connecting said lid and cooling head to said mold for enclosing said mold, a said cooling head including channel means extending between the exterior of said mold and the interior of said mold, and a source of cooling fluid connected to said channel for introducing cooling fluid into the interior of said mold while said mold is rotating about its said orthogonal axes.

2. Rotational molding apparatus as set forth in claim 1 where said cooling head includes a supporting plate through which said channel means extends, an upstanding rod mounted upon said plate for engagement with said connection means for locking said cooling head and lid in mold closing position, and a nozzle mounted upon the lower extremity of said channel means, said nozzle being provided with a plurality of radially disposed internal channels communicating with said channel means for directing fluid cooling medium against the interior wall surface of said mold, said supporting plate being provided with a plurality of uniformly spaced apertures for the venting of fluid cooling medium from said mold.

3. The device as set forth in claim 2 wherein said cooling fluid is an inert gas.

4. The device as set forth in claim 2 wherein said source of cooling fluid is stationarily mounted; said channel means including a first and second rotary union connected therein to permit said mold to rotate on said orthogonal axes with respect to said stationary source of cooling fluid.

References Cited

UNITED STATES PATENTS

| | | | |
|---|---|---|---|
| 2,926,387 | 3/1960 | Lombardo. | |
| 2,979,778 | 4/1961 | Simons | 264—85 |
| 3,095,260 | 6/1963 | Ferriot | 264—311 |

FOREIGN PATENTS

| | | |
|---|---|---|
| 1,312,348 | 11/1962 | France. |

ROY B. MOFFITT, *Primary Examiner.*